United States Patent [19]

Lane

[11] 4,436,703
[45] Mar. 13, 1984

[54] LIME SLAKER
[75] Inventor: Stanley C. Lane, Seattle, Wash.
[73] Assignee: Crown Zellerbach Corporation, San Francisco, Calif.
[21] Appl. No.: 328,272
[22] Filed: Dec. 7, 1981
[51] Int. Cl.³ .............................................. B01F 3/12
[52] U.S. Cl. .................................. 422/225; 55/257 R; 55/431; 134/198; 366/167; 422/162; 422/232; 423/640
[58] Field of Search ....................... 422/162, 225, 232; 423/243, 637, 640; 134/198–200; 366/167; 261/79 A, DIG. 27; 55/257 R, 242, 431

[56] References Cited

U.S. PATENT DOCUMENTS

| | | | |
|---|---|---|---|
| 383,957 | 6/1888 | Leffmann | 423/637 X |
| 645,425 | 3/1900 | McAllister | 261/DIG. 27 |
| 993,331 | 5/1911 | Wiens | 422/225 X |
| 1,947,852 | 2/1934 | Jewett | 422/225 X |
| 2,833,626 | 5/1958 | Knibbs et al. | 422/162 X |
| 2,882,996 | 4/1959 | Lanier et al. | 55/257 R X |
| 3,053,030 | 9/1962 | Smith | 55/242 |
| 3,086,849 | 4/1963 | Goldsmith | 422/225 X |
| 3,573,002 | 3/1971 | Zimmerman et al. | 422/162 |
| 3,620,510 | 11/1971 | Longcore | 261/79 A |
| 3,847,571 | 11/1974 | Cole, Jr. | 261/79 A X |
| 4,067,707 | 1/1978 | Atsukawa et al. | 55/242 |
| 4,261,953 | 4/1981 | Gisler | 423/640 X |

FOREIGN PATENT DOCUMENTS

| | | | |
|---|---|---|---|
| 601486 | 7/1960 | Canada | 423/640 |
| 2048107 | 12/1980 | United Kingdom | 422/225 |

Primary Examiner—Richard L. Chiesa
Attorney, Agent, or Firm—Stanley M. Teigland

[57] ABSTRACT

The invention is an improved lime slaker in which the lime is combined with the slaking liquor in a vertical conduit which extends below the level of the liquor in the slaker vessel. The slaking liquor is introduced into the conduit at a high velocity tangential to the interior surface of the conduit to flush the lime into the vessel. The slaker includes a vertical vent pipe that extends through the bottom of the vessel. In a preferred embodiment, the inlet of the vent pipe is surrounded by an entrainment separator. Removable covers permit convenient access for inspection and cleaning of the conduit and the vent pipe.

8 Claims, 2 Drawing Figures

LIME SLAKER

In the kraft pulping process, wood chips are digested in a cooking liquor containing sodium hydroxide and sodium sulfide. After the digestion is complete, the spent liquor (called black liquor) is concentrated by evaporation. The organic matter in the concentrated black liquor is burned, and the resulting smelt is dissolved in water to form green liquor, which contains sodium carbonate. After being clarified, the green liquor is causticized by combining it with lime (calcium oxide) in an apparatus called a slaker, which typically includes a reaction vessel (which includes a classification section), conduits for introducing the reactants into the reaction vessel, and a vent.

The green liquor and the lime are usually introduced into the vessel through separate conduits in the roof of the vessel and are allowed to fall through the vapor space to the liquor below. One disadvantage of this method of introducing the lime and green liquor is that lime dust becomes entrained in the water vapor which is carried out the vent, resulting in loss of lime and formation of scale in the vent.

Various methods have been proposed in the prior art for reducing the amount of lime dust in the vapor space. One method involves introducing some of the green liquor into the vessel through shower heads to wet the lime dust, but scale tends to form on and in the shower heads, reducing the flow of green liquor. Another method involves introducing the green liquor through a chute which extends below the surface of the liquor in the vessel, and introducing the green liquor into the chute in a random splashing manner. This method, however, results in a substantial amount of lime and green liquor scale forming on the walls of the chute and on the surfaces of the vent.

To reduce the formation of scale in the vent, a stream of water or green liquor may be sprayed into the vent. When water is used, the vent is offset from the vessel with a curved secton so the water does not flow into the vessel to dilute the liquor, but since the curved section is not flushed with water, heavy scale tends to form in the curved section.

This invention provides an improved method and apparatus for slaking lime.

Figure 1:
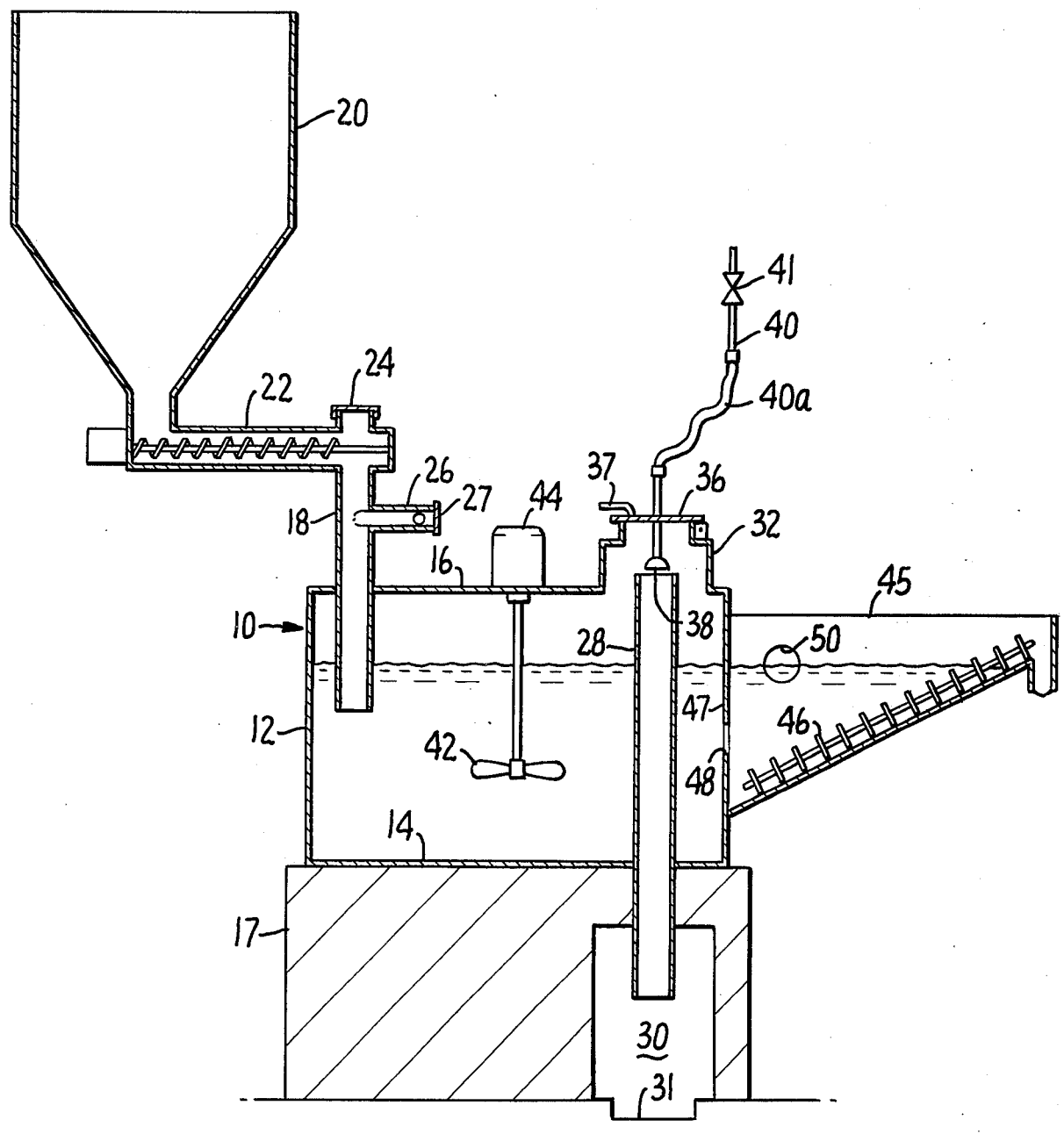
FIG. 1 is a sectional elevation of the lime slaker of this invention.

The slaker includes a vessel 10 having a side wall 12, floor 14 and roof 16. The vessel 10 is supported on a foundation 17.

A substantially vertical conduit 18 for introducing lime into the vessel 10 extends from a point above the vessel 10 through the roof 16 of the vessel 10 to a point below the desired level of liquor in the vessel 10. Lime is fed to the conduit 18 from a silo 20 through a screw feeder 22. A removable cover 24 is provided above the inlet end of the conduit 18 to allow access to the conduit 18 for inspection and cleaning. In a preferred embodiment, the cover 24 covers an opening in the screw feeder 22, and the portion of the screw feeder shaft located below the opening is constructed without screw flights to permit access to the conduit 18 from the opening.

A feed pipe 26 for introducing the green liquor into the vessel is joined to the conduit 18 between the point at which the lime is introduced into the conduit and the roof 16. The discharge end of the feed pipe 26 is tangential to an interior surface of the conduit 18. As a result, when the green liquor is discharged into the conduit 18, it swirls down the interior surface of the conduit, thereby continuously wetting and cleaning the interior surface. The feed pipe 26 is preferably substantially horizontal. It can be fitted with an access plate 27, such as at an elbow, to facilitate cleaning.

A substantially vertical vent pipe 28 extends from a point within the vessel above the desired level of liquor (i.e., in the vapor space) through the floor 14 of the vessel 10 to a space 30 below the vessel 10. The space 30 may be a tunnel or cutout in the foundation 17, and preferably contains a drain trench 31.

Figure 2:
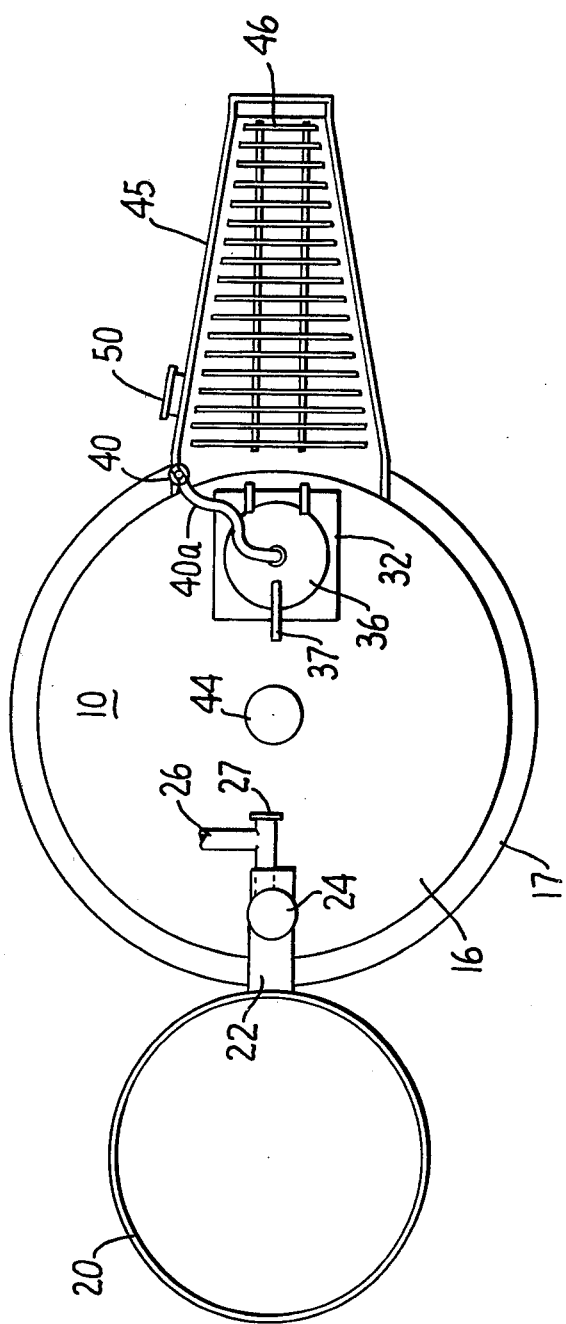
FIG. 2 is a top view of the lime slaker.

The inlet end of the vent pipe 28 is preferably surrounded by an entrainment separator 32, which forms a cupola on the vessel 10. The cross section of the separator 32 shown in FIG. 2 is square, but it could be round. The entrainment separator 32 has an opening located above the inlet end of the vent pipe 28. A cover 36 covers the opening. The cover 36 can be opened to allow access to the vent pipe 28 for cleaning. The cover 36 is preferably hinged to the separator 32, and preferably is sufficiently heavy to prevent, by its own weight, the escape of vapor or liquor through the opening. (If desired, a gasket may be used to improve the seal between the cover 36 and the opening.) When the cover 36 is secured to the separator 32 only by hinges, it can readily be swung open. A lifting arm 37 extending from the cover 36 may be used to open the cover 36 more easily. If the slaker does not have an entrainment separator, the opening above the inlet of the vent pipe 28 would be in the roof 16, and the cover 36 would be hinged to the roof.

A shower head 38 is disposed at the inlet of the vent pipe 28 for continuously spraying water into the vent pipe 28 when the slaker is in operation. The shower head 38 is connected to a source of water through a tube 40. A valve 41 is interposed in the tube 40 to control the flow of water. In a preferred embodiment, the tube 40 extends through the vent cover 36, and is flexible for a section 40a between the cover 36 and the source of water to allow the cover 36 to be opened.

An agitator 42 driven by a motor 44 is used to agitate the contents of the vessel 10.

The vessel 10 includes a classifier section 45. The primary purpose of the classifier section 45 is to separate large particles of unreacted lime from the liquor. The particles are removed from the vessel by means of a rake 46 at the bottom of the classifier section. A bulkhead 47 separates the classifier section 45 from the rest of vessel 10, but a hole 48 in the bulkhead 47 allows the liquor to flow into the classifier section 45.

A discharge port 50 for withdrawing causticized liquor from the vessel 10 is provided in the side wall 12 of the vessel in the classifier section 45. Since the liquor is withdrawn from the vessel 10 through the discharge port 50, the desired level of liquor in the vessel 10 is at the height of the discharge port 50. However, other means can be used to maintain a desired level of liquor in the vessel.

The lime to be slaked is contained initially in the silo 20, from which it is fed to the conduit 18 through the screw feeder 22. The lime falls from the screw feeder 22 into the conduit 18. Green liquor mixes with the lime in the conduit 18 at the discharge end of the feed pipe 26 and flushes it into the vessel 10. The green liquor enters the conduit at a high tangential velocity and flows in a cyclonic (spiral) path down the conduit 18, thereby preventing accumulation of solids in the conduit 18. The high velocity can be effected by constricting the discharge end of the feed pipe 26, if necessary.

Since the outlet of the conduit 18 is below the level of the liquor in the vessel 10, the lime and the green liquor do not fall through the vapor space in the vessel 10; and since the lime is also wetted by the green liquor before it enters the vessel 10, the amount of lime in the vapor space is greatly reduced. This not only saves lime that otherwise would have escaped out the vent pipe 28, it also eliminates the need to employ green liquor showers in the vessel or to employ a scrubber and exhaust fan. Another advantage of this design is that there is less contact between the green liquor and oxygen, which results in less oxidation of the sodium sulfide in the green liquor to sodium thiosulfate. (The formation of sodium thiosulfate increases the corrosivity of the liquor.) Still another advantage is that the lime contacts the green liquor when it is most concentrated, thereby increasing the rate of reaction. Yet another advantage is that the screw feeder 22 is isolated from the contents of the vessel 10, which are at a higher temperature (typically 94°-102° C.) than the green liquor feed (typically 88°-93° C.) because the reaction is exothermic. As a result, the hot vapor in the vapor space is prevented from migrating to the screw feeder 22 and silo 20, and the condensation of vapor on their surfaces (which would inhibit the flow of lime) is greatly reduced.

Excess hot vapor in the vapor space flows down through the vent pipe 28. Since the outlet of the vent pipe 28 is below the vessel 10, the flow of excess vapor through the vent does not draw undesired outside air into the vessel. In contrast, a conventional vent pipe extending above the vessel, like a chimney, produces a draft caused by the flow of hot vapor up the vent pipe, which reduces the pressure within the vessel, resulting in the flow of undesired outside air through the vapor space and up the pipe with a substantial loss of energy from the system in heating the air and saturating it with water vapor.

In the invention, the excess vapor, which may occasionally contain entrained liquor and solids, is forced to turn 180° by the entrainment separator 32, which reduces the amount of liquor and solids carried out with the vapor. Any scale which may accumulate on the bottom of the vent cover 36 can be dislodged by striking the top of the cover 36; and by raising the cover 36, access can conveniently be gained to the entrainment separator 32 and vent pipe 28 for cleaning. When the cover 36 is swung open, the shower head 38 swings with it into the open, where it can readily be inspected, cleaned or changed. The valve 41 allows the water to be turned off before the cover 36 is opened, and also allows the water to be turned on with the cover in the open position to permit inspection of the spray pattern.

The vent pipe 28 is preferably not braced by the side wall 12 so that it will vibrate due to agitation of the liquor in the vessel 10. The vibration helps to dislodge scale. The water which is sprayed into the vent pipe 28 through the shower head 38 also helps to prevent scale from forming inside the pipe 28. The water also cools and condenses a substantial portion of any excess vapor flowing from the vessel 10, as well as wetting (scrubbing) any solids entrained in the vapor.

The water and condensed vapor are discharged from the vent pipe 28 into space 30, from which the water is drained away. The outlet of the vent pipe 28 preferably should not be submerged in the drain water, and preferably is sufficiently above the drain trench 32 to permit access for cleaning. Any overflow which may result from an unexpected rise in the level of liquor in the vessel 10 will also flow through the vent pipe 28 and be drained away.

An important feature of the invention is that the operator can routinely inspect and clean the key components of the system with a minimum of downtime and without summoning maintenance personnel or having to drain the vessel. This and other features of the invention reduce the operating cost of the slaker. The capital cost of the slaker is also reduced.

Another important feature is that the slaker is substantially completely enclosed and sealed except for the vent pipe 28. As a result, whenever the contents of the slaker boil over, the overflow is safely contained in the space 30 below the vessel 10 instead of being spewed out the top, which would endanger the operator and other workers. Also, since the slaker is enclosed, undesired outside air is prevented from being drawn into the slaker, thereby avoiding oxidation of the liquor and saving energy by avoiding contact between cold, unsaturated atmospheric air and the hot liquor within the vessel.

Although this invention has been described with particular reference to slaking lime with green liquor from kraft pulping, the slaker can be used in other slaking operations, such as in preparing a lime slurry for scrubbing sulfur dioxide from flue gas in power plants.

I claim:

1. In a lime slaker comprising a vessel, means for maintaining a desired level of liquor in the vessel, and a vent pipe for allowing excess hot vapor in the vessel to escape, the improvement wherein the vent pipe is a substantially vertical pipe extending from a point within the vessel above the desired level of liquor and through the bottom of the vessel to a space below the vessel, with the outlet of the vent pipe being below the vessel, and a shower head for spraying water into the vent pipe is disposed at the inlet end of the vent pipe, the shower head being connected to means for supplying water to the shower head, whereby the water sprayed into the vent pipe flows into the space below the vessel and drains therefrom.

2. The improvement of claim 1 wherein the inlet end of the vent pipe is surrounded by an entrainment separator.

3. The improvement of claim 2 wherein the entrainment separator has an opening above the inlet end of the vent pipe, and a cover hinged to the entrainment separator covers the opening.

4. The improvement of claim 1 wherein the slaker includes an opening above the inlet end of the vent pipe and a cover covering the opening, and wherein the means for supplying water includes a tube extending from the shower head through the cover to a source of water, the tube being flexible for a section between the cover and the source of water to allow the cover to be opened.

5. In a slaker comprising a vessel, means for maintaining a desired level of liquor in the vessel, and a vent pipe for allowing vapor in the vessel to escape, the improvement wherein the vent pipe is a substantially vertical pipe extending from a point within the vessel above the desired level of liquor and through the bottom of the vessel to a space below the vessel, the inlet end of the vent pipe being surrounded by an entrainment separator, the entrainment separator having an opening above the inlet end of the vent pipe, the opening being covered by a cover hinged to the entrainment separator, and a shower head for spraying water into the vent pipe is disposed at the inlet end of the vent pipe, the shower head being connected to means for supplying water to the shower head.

6. The improvement of claim 5 wherein the means for supplying water includes a tube extending from the shower head through the cover to a source of water, the tube being flexible for a section between the cover and the source of water to allow the cover to be opened.

7. Apparatus for slaking lime comprising (a) a vessel having a roof, a floor and side walls, (b) means for maintaining a desired level of liquor in the vessel, (c) a substantially vertical conduit for introducing lime into the slaker, the conduit extending from a point above the vessel through the roof of the vessel to a point below the desired level of liquor, (d) a feed pipe for introducing an aqueous liquor into the vessel, the feed pipe being joined to the conduit between the point at which lime is introduced into the conduit and the roof of the vessel, the discharge end of the feed pipe being tangential to an interior surface of the conduit, whereby as the aqueous liquor is discharged into the conduit it swirls down along the interior surface of the conduit into the vessel, (e) a substantially vertical vent pipe extending from a point within the vessel above the desired level of liquor, and through the floor of the vessel to a space below the vessel, (f) a shower head disposed at the inlet of the vent pipe for spraying water into the vent pipe, the shower head being connected to means for supplying water to the shower head.

8. The apparatus of claim 7 including an entrainment separator surrounding the inlet end of the vent pipe.

* * * * *